(12) United States Patent
Suzuki (10) Patent No.: US 10,225,417 B2
(45) Date of Patent: Mar. 5, 2019

(54) INFORMATION PROCESSING APPARATUS IN COMMUNICATION WITH A PRINTING APPARATUS, CONTROL METHOD, AND COMPUTER READABLE STORAGE MEDIUM

(71) Applicant: CANON KABUSHIKI KAISHA, Tokyo (JP)

(72) Inventor: Tomohiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/602,745

(22) Filed: May 23, 2017

(65) Prior Publication Data

US 2017/0346966 A1 Nov. 30, 2017

(30) Foreign Application Priority Data

May 31, 2016 (JP) ................. 2016-108759

(51) Int. Cl.
*G06F 3/12* (2006.01)
*H04N 1/00* (2006.01)

(52) U.S. Cl.
CPC ..... *H04N 1/00411* (2013.01); *H04N 1/00244* (2013.01); *H04N 1/00604* (2013.01); *H04N 1/00912* (2013.01)

(58) Field of Classification Search
None
See application file for complete search history.

(56) References Cited

U.S. PATENT DOCUMENTS

2006/0080687 A1* 4/2006 Miyashita ............. B41J 3/4071
720/603
2014/0379913 A1* 12/2014 Niimura ................ H04L 67/34
709/225

FOREIGN PATENT DOCUMENTS

JP 2004-338338 12/2004
JP 2016-14920 1/2016

* cited by examiner

*Primary Examiner* — Henok Shiferaw
(74) *Attorney, Agent, or Firm* — Venable LLP (57) ABSTRACT

A control method controls an apparatus capable of communicating with a printing apparatus that performs printing on at least one print medium arranged in a tray having a plurality of sites for arranging the print medium. The method includes obtaining information on an arrangement site indicating a site where the print medium is arranged among a plurality of arrangement sites of the print medium in the tray, notifying, to a user, the arrangement site of the print medium in the tray on the basis of information on the arrangement site, and transmitting, to the printing apparatus, printing data for printing an image on the print medium arranged on the tray, which is generated on the basis of the information on the arrangement site.

15 Claims, 12 Drawing Sheets

INFORMATION PROCESSING APPARATUS IN COMMUNICATION WITH A PRINTING APPARATUS, CONTROL METHOD, AND COMPUTER READABLE STORAGE MEDIUM

BACKGROUND OF THE INVENTION

Field of the Invention

The invention relates to a technique for handling information on arrangement of print medium in a tray.

Description of the Related Art

Unlike sheets such as paper which are generally used for printing, printing media such as discs have high hardness. Therefore, in a case where an image is printed on the surface of a print medium such as a disc by an inkjet printing apparatus or the like, instead of a sheet conveying mechanism, a disc is arranged on a tray, and printing is performed on the surface of the disc by using a mechanism for conveying the tray.

Japanese Patent Laid-Open No. 2004-338338 discloses a technology capable of using media of various shapes by placing a print medium such as a disc (hereinafter, simply referred to as "medium") on a tray through an adapter. In addition, it is determined whether or not a medium appropriate for the adapter is arranged on the tray, and if it is an error, a notice indicating the message is issued to a user.

However, Japanese Patent Laid-Open No. 2004-338338 does not disclose a tray of a type capable of arranging a plurality of media in one tray. Therefore, in a case where the user cannot synchronize the operation of arranging a plurality of media on a tray having a plurality of arrangement sites for arranging the plurality of media with the printing processes, there is a problem in that the user cannot obtain a desired print result.

SUMMARY OF THE INVENTION

According to an aspect of the invention, there is provided a non-transitory computer readable storage medium storing a program for causing an information processing apparatus capable of communicating with a printing apparatus that performs printing on at least one print medium arranged in a tray having a plurality of sites for arranging the print medium to execute a control method, wherein the control method including: obtaining information on an arrangement site indicating a site where the print medium is arranged among a plurality of arrangement sites of the print medium in the tray; notifying, to a user, the arrangement site of the print medium in the tray on the basis of information on the arrangement site; and transmitting, to the printing apparatus, printing data for printing an image on the print medium arranged on the tray, which is generated on the basis of the information on the arrangement site.

Further features of the present invention will become apparent from the following description of exemplary embodiments with reference to the attached drawings.

DESCRIPTION OF THE EMBODIMENTS

Hereinafter, embodiments of the invention will be described in detail with reference to the drawings.

<Hardware Configuration of Information Processing Apparatus>

Figure 1:
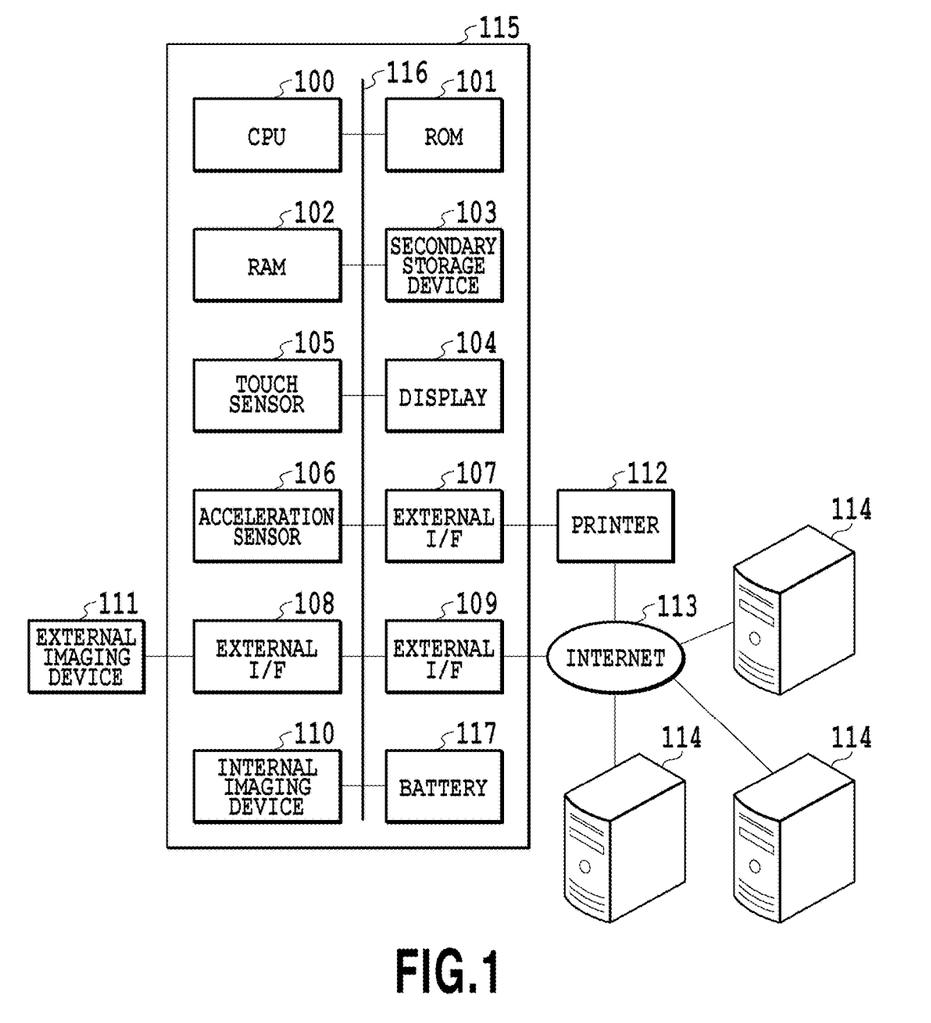
FIG. 1 is a block diagram illustrating a configuration of an information processing system.

FIG. 1 is a block diagram illustrating a configuration of an information processing system configured to include an information processing apparatus according to an embodiment of the invention. The information processing apparatus 115 may be, for example, a portable information terminal such as a smartphone or a mobile phone. In addition, the information processing apparatus 115 may be a personal computer having an information processing unit or a printer 112. The information processing apparatus 115 is configured include a display unit having a function as an input IF described below. Hereinafter, a case where the information processing apparatus 115 is a smartphone will be described as an example.

In the information processing apparatus 115 in FIG. 1, a CPU (central processing unit/processor) 100 executes various processes described below in accordance with programs. In addition, one CPU 100 is illustrated in in FIG. 1, but a plurality of CPUs or CPU cores may be included. A ROM 101 stores programs such as software programs which are to be executed by the CPU 100 and described later with reference to FIG. 3. A RAM 102 is a memory for temporarily storing various types of information at the time of executing a program by the CPU 100.

In the information processing apparatus 115, a secondary storage device 103 is a storage device such as a hard disk or a flash memory and stores files, data of a database or the like for retaining processing results of image analysis and the like, and various programs. A display 104 displays a UI (user interface) for receiving an operation for executing various processes such as medium printing described later in FIG. 4 and the like or various types of information of processing results or the like of the executed processes. The display 104 may include a touch sensor 105. The information processing apparatus 115 may also be configured to include an internal imaging device 110. Image data obtained by imaging of the internal imaging device 110 undergoes predetermined image processing, and after that, the image data is stored in the secondary storage device 103. In addition, the image data may be read from an external imaging device 111 connected via an external I/F (interface) 108. Furthermore, the information processing apparatus 115 is configured to include an acceleration sensor 106 to be capable of obtaining acceleration information on position and orientation of the information processing apparatus 115 itself.

The information processing apparatus 115 is configured to include an external I/F (interface) 109 to be capable of performing communication via a network 113 such as the Internet. The information processing apparatus 115 can also obtain image data from a server 114 connected to the network 113 via the communication I/F 109. Furthermore, the information processing apparatus 115 is connected to the printer 112 via an external I/F 107 to be capable of outputting data such as image data. Power necessary for the operations of the information processing apparatus 115 is supplied by a battery 117. The various components of the information processing apparatus 115 are mutually connected via a control bus/data bus 116, and the CPU 100 controls the various components via the control bus/data bus 116.

The printer 112 is also connected to the network 113 to be capable of transmitting and receiving data necessary for the printer via the external I/F 109. In other words, the information processing apparatus 115 is connected so as to be capable of communicating with the printer 112. The external I/Fs 107 to 109 are interfaces having at least one communication mode of wired communication and wireless communication and communicate with an external device (the printer 112 or the server 114) according to the communication mode to be used. For example, the wired communication includes USB, Ethernet (registered trademark), and the like, and the wireless communication includes wireless LAN, NFC, Bluetooth (registered trademark), infrared communication, and the like. In a case of using a wireless LAN as the wireless communication, there is a mode in which apparatuses are directly connected to each other or a mode in which the apparatuses are connected via a relay apparatus such as a wireless LAN router. In addition, although the external I/Fs 107 to 109 are separately configured in the drawing, the external I/Fs may be configured integrally.

In addition, in the present embodiment, the information processing apparatus 115 is a software execution location (software execution environment) where software such as a program is executed by a control unit (CPU 100) included in the information processing apparatus 115.

<Software Configuration>

Figure 2:
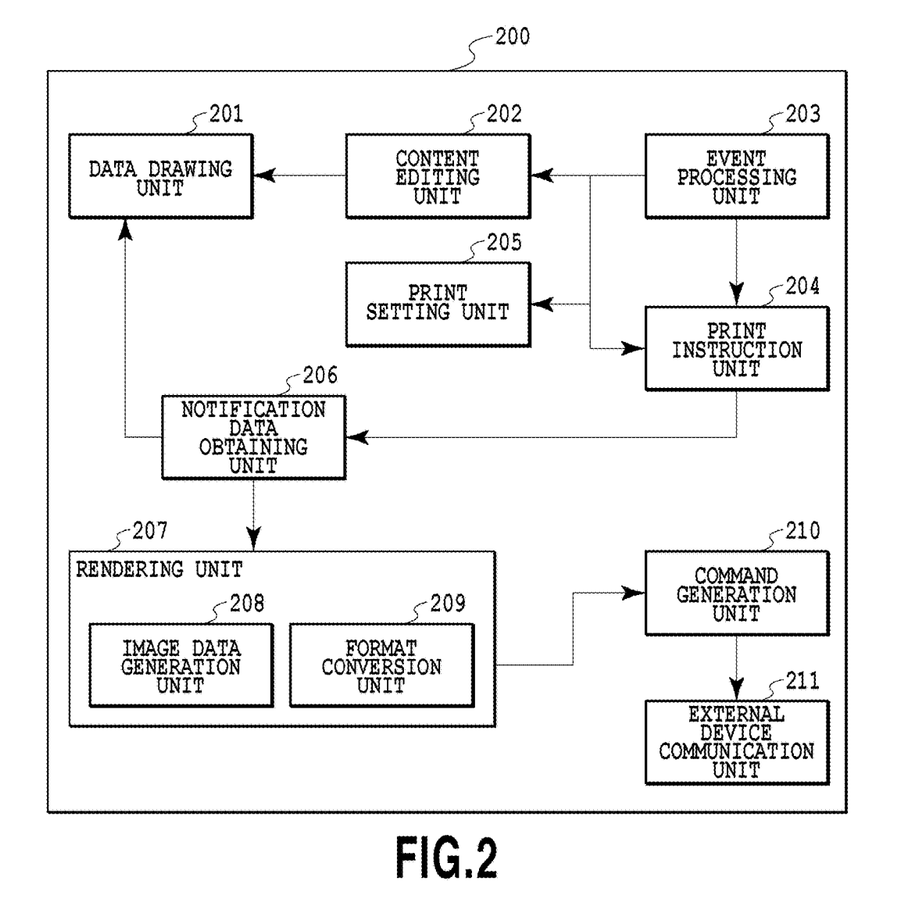
FIG. 2 is a block diagram illustrating a configuration of software executed by the information processing apparatus.

FIG. 2 is a block diagram illustrating a configuration of the software executed by the information processing apparatus 115 illustrated in FIG. 1 and illustrates a configuration of application software described later in FIG. 3. In FIG. 2, the software 200 has the following functions.

A data drawing unit 201 performs a process of drawing information on the display 104 on the basis of content information transmitted from a content editing unit 202. The content will be described later with reference to FIG. 4 or the like. The content editing unit 202 performs a process of editing the content according to the type of data transmitted from an event processing unit 203. As a process of editing the content, for example, addition of a stamp, addition of characters, or the like may be exemplified. The event processing unit 203 performs a process of obtaining data indicating operations such as clicking and tapping of a stamp button performed by the user on the application. The event processing unit 203 transmits data based on the event to the content editing unit 202, a print instruction unit 204, and a print setting unit 205 according to the obtained content of the operation.

The print instruction unit 204 obtains information necessary for printing and obtaining the notification data and transmits the data to a notification data obtaining unit 206. The information necessary for printing is content information retained by the content editing unit 202 and information set by the print setting unit 205. The notification data is data for notifying, to the user, the medium arrangement and the like. The details of the information necessary for obtaining the notification data will be described later with reference to FIG. 3 and the like. The print setting unit 205 performs a process of setting information on the number of media to be printed, information on a tray to be used, and the like on the basis of the information from the event processing unit 203. On the basis of the data transmitted from the print instruction unit 204, the notification data obtaining unit 206 performs a process of obtaining the notification data indicating information on where the medium is be arranged to the user. The data obtained by the notification data obtaining unit 206 is transmitted to the data drawing unit 201 and displayed on the display 104 so that the user can confirm the data.

A rendering unit 207 performs a rendering process on the content. The rendering process is a process of converting a size and format of the generated content so as to be appropriate for transmission to the printer. An image data generation unit 208 performs a process of converting the received content into bitmap data. This conversion also includes a process of scaling the size of the content so as to be appropriate for printing. A format conversion unit 209 further converts the format of the bitmap data into a format that can be transmitted to the printer. For example, the process is a process of converting the format into a JPEG (Joint Photographic Experts Group) or the like which can be used by a printer as a general image format. A command generation unit 210 generates a command for transmission to the printer and performs a process of combining the command with the image data. For example, even though image data such as JPEG is generated by the rendering unit 207, the image data is not transmitted to the printer as it is. In a case of printing with a printer, this is because it is necessary to simultaneously transmit information such as a "type of medium to be used", a "print size", and a "format of print data" to the printer. As the information necessary for causing the printer to perform the printing operation, information other than the image data is called a "command". An external device communication unit 211 performs a process of transmitting data to the printer 112 via the external I/F 107.

(First Embodiment)

Figure 3:
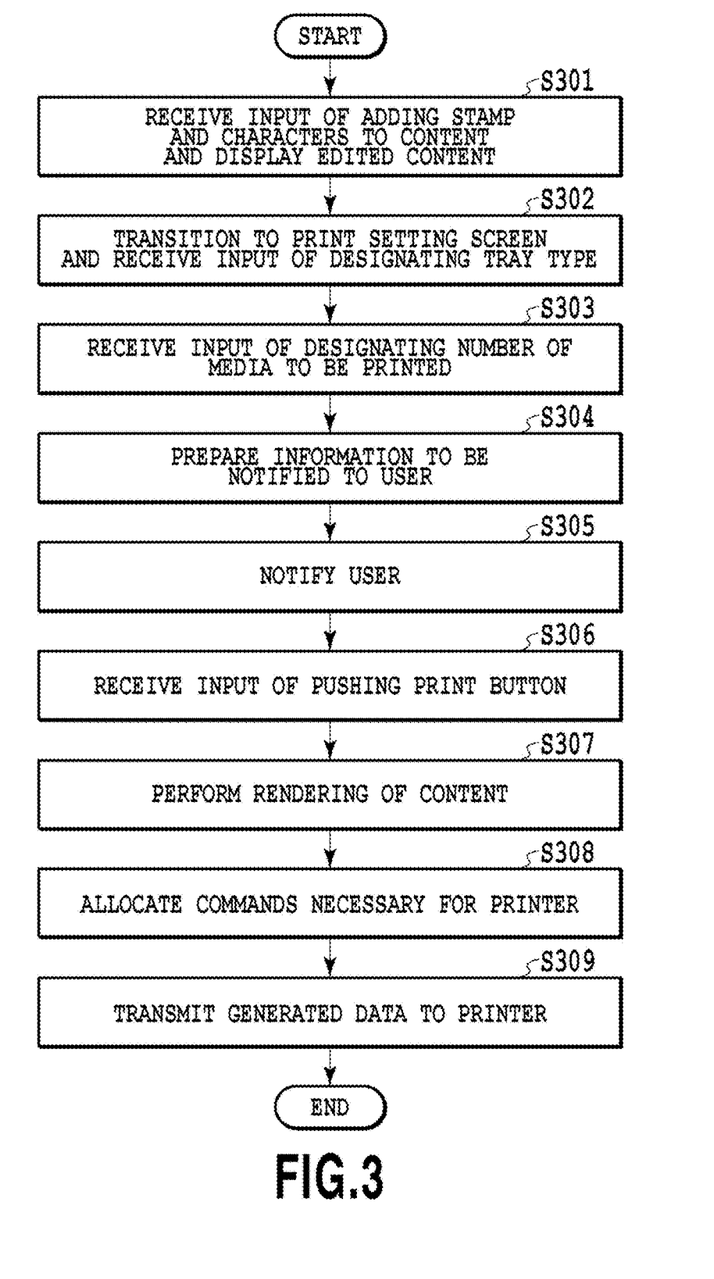
FIG. 3 is a flowchart illustrating a printing setting process in the information processing apparatus.

FIG. 3 is a flowchart illustrating a printing setting process in the information processing apparatus 115 in a case of performing printing on a print medium arranged in a tray according to the first embodiment of the invention. FIG. 3 illustrates a process by application software having the configuration illustrated in FIG. 2. With respect to the printing setting process according to the present embodiment includes a process in which, in a case where there are a plurality of sites where printing media are arranged in one tray, the position where one or more media are arranged according to the number of media to be arranged is determined by the application. Then, the printing setting process includes a process of urging the user to arrange the determined media, generating print data according to the arrangement, and transmitting the print data to the printer. In addition, in the example described hereinafter, the medium is a guitar pick. In addition, hereinafter, the guitar pick is simply referred to as a "pick". In addition, the application according to the present embodiment is not limited to the application for printing the pick. In the description hereinafter, it is assumed that the application is generated in HTML (Hyper Text Markup Language) and JavaScript (registered trademark). In addition, it is assumed that the content is described in SVG (Scalable Vector Graphics). SVG is one of the description methods for drawing graphics available in Web standard language. In addition, the flowchart of FIG. 3 is realized by the CPU 100 reading a program associated with the flowchart from a memory such as the ROM 101 and executing the program.

Figure 4:
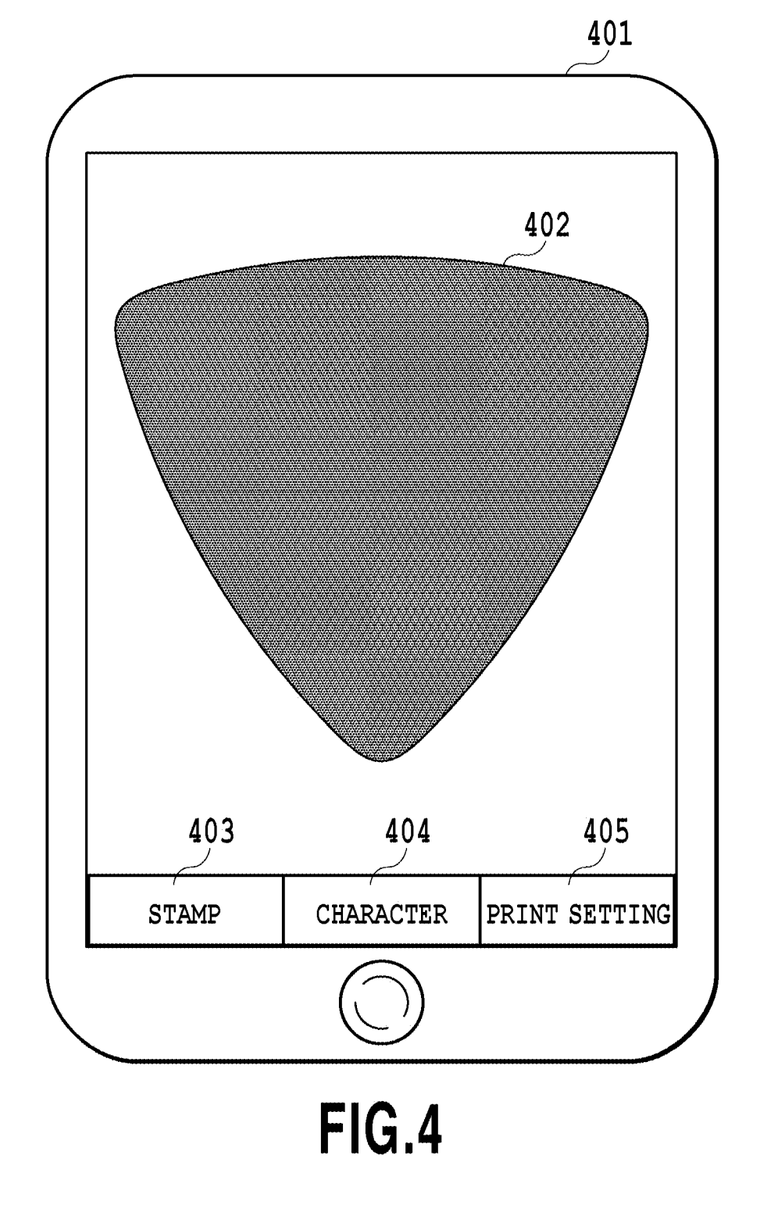
FIG. 4 is a diagram illustrating a screen of a content.
Figure 6:
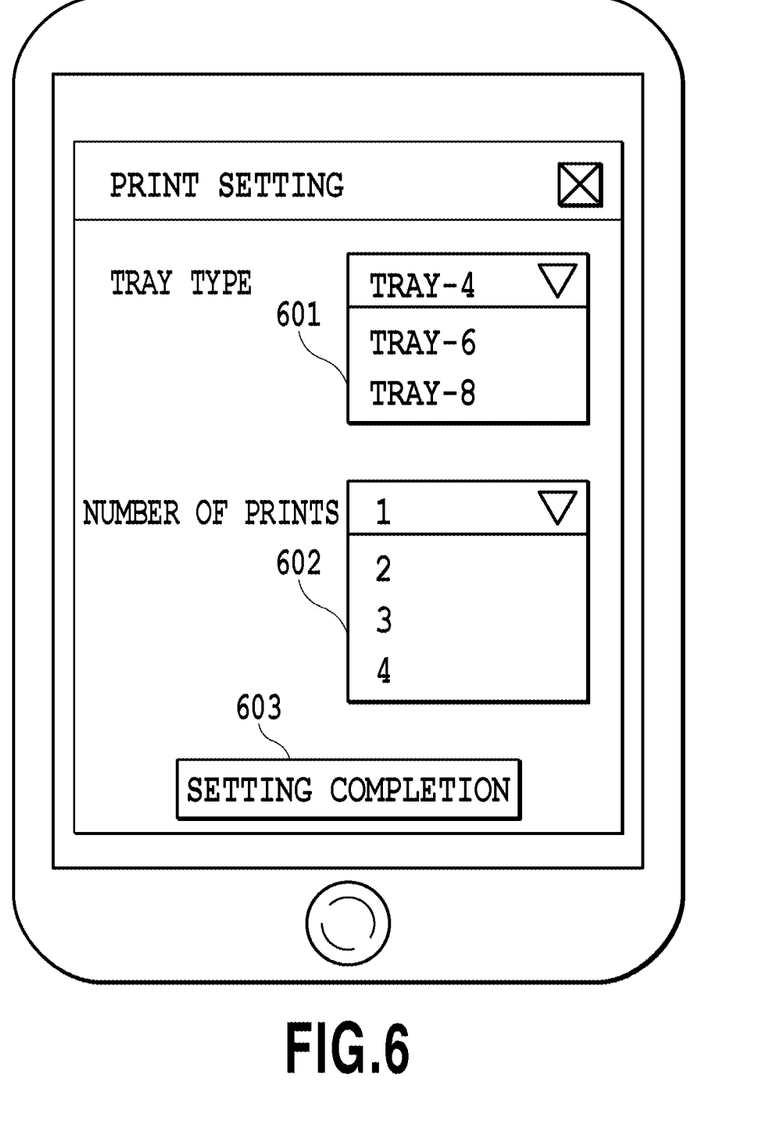
FIG. 6 is a diagram illustrating a print setting screen.

If the information processing apparatus 115 starts the program of the application illustrated in FIG. 3, the screen illustrated in FIG. 4 is displayed on the display 104. FIG. 4 is a diagram including a screen of contents in the printing setting displayed by the application according to the present embodiment. FIG. 4 may also be a diagram including an interface screen (hereinafter, also referred to as a UI) for the user. A smartphone 401 in FIG. 4 represents a device (information processing apparatus 115) of operating the application of guitar pick printing described in the present embodiment. An editing area 402 represents an area that can be edited by this application. In the example of FIG. 4, the editing area 402 represents the shape of the pick. A stamp addition button 403 is a button for adding a stamp to the editing area 402. A character addition button 404 is a button for adding characters to the editing area 402. The print setting button 405 is a button for transitioning to a screen for print setting (FIG. 6). In the description hereinafter, the content of the editing area 402 itself in which stamps and characters can be added and the content of the state after the editing area 402 is edited are referred to as a "content".

Figure 5:
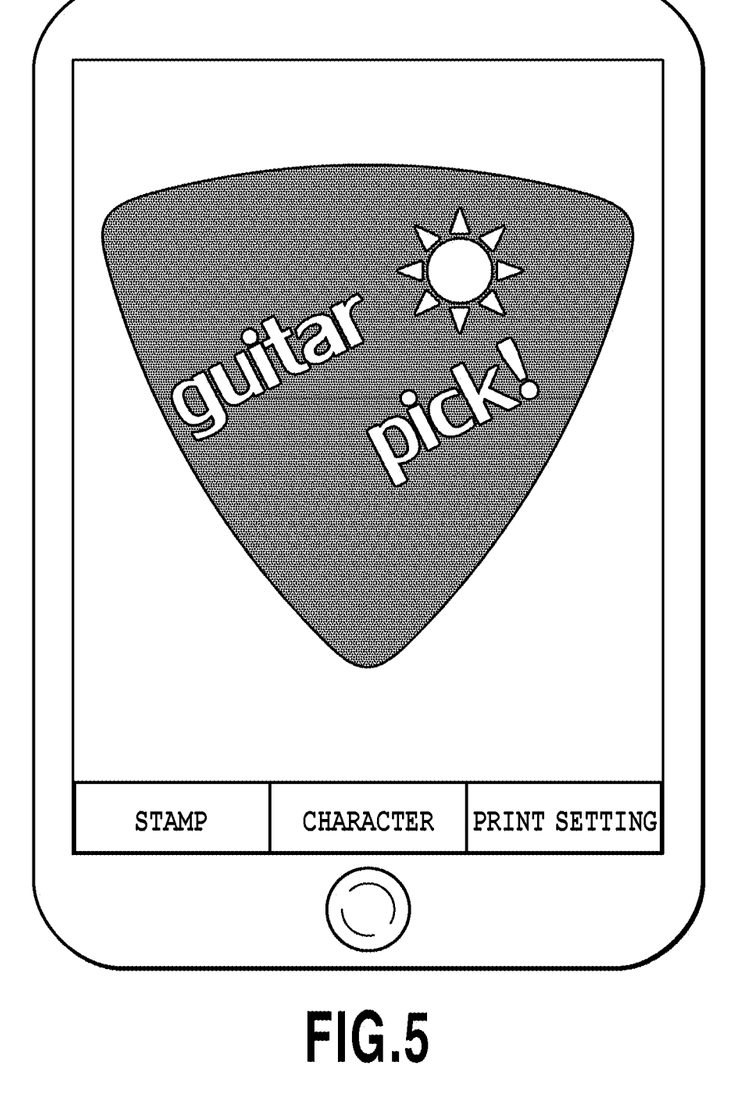
FIG. 5 is a view illustrating a screen of a content to which a stamp and characters are added.

First, in step S301, the event processing unit 203 receives an input indicating that a stamp or a character is added by the user and obtains input information. Then, the content editing unit 202 performs editing according to the obtained information. The data drawing unit 201 displays the edited content on the display 104. In the present embodiment, if the stamp addition button 403 is pushed, a stamp of an image (figure) of the sun is added to the content. If the character addition button 404 is pushed, the characters "guitar pick!" are added to the content. In addition, the stamp may be arbitrarily selected from various types. The addition of characters may be a reflection of arbitrary input. With respect to the flow of data of software in step S301, if the stamp button 403 is pushed, this event is caught by the event processing unit 203, and a command to add the stamp is transmitted from the event processing unit 203 to the content editing unit 202. The content editing unit 202 adds the stamp to the content illustrated in FIG. 4 and requests the data drawing unit 201 to draw the content to which the stamp is added. Finally, the content to which the stamp is added is displayed on the display 104. The flow of data in a case where the character addition button 404 is pushed is the same as that in a case where the stamp button 403 is pushed. FIG. 5 is a diagram including a display screen of a content in which a stamp 501 of an image of the sun and characters 502 and 503 are added.

The function of the application is not limited to the functions of adding a stamp and adding characters as described above. Other functions such as a function of adding an image, a function of attaching a background image to the content, or a function of performing image processing on the above-described image may be added. The user performs editing using the above-described operations in the information processing apparatus 115. As a result, the final content to be printed in the pick is generated.

The description of the content added with the stamp and the characters according to the present embodiment described heretofore are illustrated below. In addition, in a case where displaying of FIG. 5 is performed, the following description of the content is transmitted from the content editing unit 202 to the data drawing unit 201, and the data drawing unit 201 performs drawing in accordance with the description of this content, so that the content illustrated in FIG. 5 is displayed. In addition, the following description of the content is also used for generation of image data in FIG. 9 and display processing in FIG. 10 described later.

```
01 : <svg width="80" height="80"
xmlns="http://www.w3.org/2000/svg" xmlns:
xlink="http://www.w3.org/1999/xlink" ViewBox="008080">
02 :   <defs>
03 :     <clipPath id="pick">
04 :       <path d="path to clip shape of pick"/>
05 :     </clipPath>
06 :   </defs>
07 :   <g clip-path="url ('#pick')">
08 :     <rect width="100%" height="100%" fill="black"/>
09 :     <image x="48" y="8" width="16" height="16" xlink:
href="sun.jpg"/>
10 :     <text transform="rotate (-30, 40, 40)" x="15"
y="30" fill="white"> guitar </text>
11 :     <text transform="rotate (-30, 40, 40)" x="40"
y="55" fill="white"> pick! </Text>
12 :   </g>
13 : </svg>
```

In the description of the content, the numeral attached to the left side of each line is the line number attached in order to explain the content. Line 1 indicates that the description of this content is described in SVG and indicates the SVG size. Lines 2 to 6 are definitions for adjusting the editing area so that editing can be performed only within the range of the editing area 402. Lines 7 and 8 indicate that black square is clipped to have a shape of a pick to be set as the background. Lines 9 to 11 are descriptions of elements of the content and indicate that a stamp 501 of an image of the sun and rotated characters 502 and 503 are added. In addition, the elements of Lines 9 to 11 are also clipped to have the shape of a pick, so that the stamp or characters does not protrude from the editing area 402.

Figure 7A:
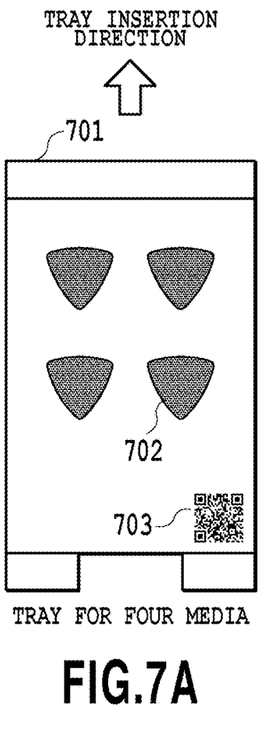
FIGS. 7A to 7C are diagrams illustrating three types of trays that can be designated.
Figure 7B:
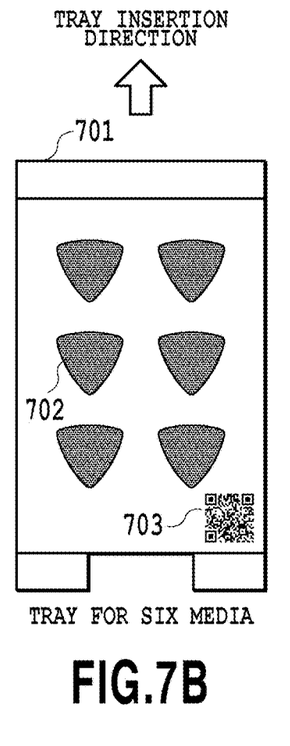
Figure 7C:
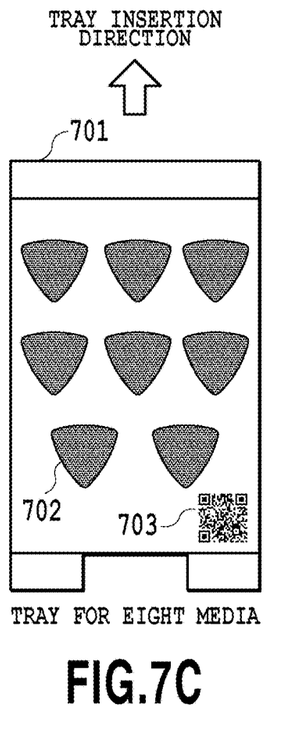

Next, in step S302, the event processing unit 203 receives the input of the print setting button 405 pushed by the user on the display screen illustrated in FIG. 5. Accordingly, the application transitions to the print setting screen illustrated in FIG. 6. The event processing unit 203 receives the input of the tray type designation and obtains the designated information. In the application according to the present embodiment, as illustrated in FIG. 6, it is assumed that an arbitrary tray can be selected to be used among three types of trays. FIGS. 7A to 7C are diagrams illustrating three types of trays. These are examples of trays having a plurality of sites where media can be arranged. In FIGS. 7A to 7C, picks (media) are arranged and retained in the tray 701. Arrangement sites 702 indicate the sites where the picks are arranged in the tray. FIGS. 7A, 7B, and 7C have four, six, and eight arrangement sites 702, respectively. Each arrangement site 702 has the same shape as a pick. Namely, these arrangement sites 702 are formed as concave portions on the tray 701. Picks as media are fitted in these concave portions. The tray into which the picks are fitted is inserted in the tray insertion direction, and printing is to be performed. Since the picks are fitted in the concave portions, the pick can be retained and fixed during the printing operation. A QR code (registered trademark) 703 is a code including information on the tray. FIGS. 7A, 7B, and 7C illustrate trays in which four, six, and eight picks can be arranged, respectively, and correspond to the tray types "Tray-4" "Tray-6", and "Tray-8" on the print setting screen illustrated in FIG. 6, respectively. Furthermore, in the examples illustrated in FIGS. 7A to 7C, the upward direction is the inserting direction of the tray.

On the print setting screen illustrated in FIG. 6, the user clicks one of the types of trays in the tray type selection tab 601 to designate the type of tray. As illustrated in FIGS. 7A to 7C, in a case where there are a plurality of available trays, the user sets which tray to use in the application. In the application, the event processing unit 203 receives an input designating the tray on the print setting screen and obtains the designated information. Then, the event processing unit 203 transmits the obtained information to the print setting unit 205, and the information is retained in the print setting unit 205. Similarly, the setting of the number of media in step S303 described later is retained in the print setting unit 205.

In addition, in the present embodiment, the tray to be used is designated and selected by the operation of the user, but the invention is not limited to such a method. The tray to be used may be designated by reading the QR code 703 of the tray or the bar code attached to the tray by using a camera function of the smartphone as the information processing apparatus. Alternatively, the developer of the application may retain the information of the tray on the server, and the information may be configured to be downloaded from the server to be used. In this manner, the information on the tray is allowed to be provided to the tray itself or the outside of the tray, so that the application itself does not need to store the information of the tray. By doing so, it is possible to flexibly deal with trays having various shapes.

Next, in step S303, the event processing unit 203 receives an input of the number of prints designated by the user and obtains the designated information. Herein, the "number of prints" denotes how many picks are to be printed. In the present embodiment, the same content is printed on a plurality of picks. The user designates the number of prints (the number of media) by clicking any one of "1", "2", "3", and "4" in "print number" illustrated in FIG. 6. Then, the user pushes the setting completion button 603 illustrated in FIG. 6. The event processing unit 203 transmits, to the print instruction unit 204, the message indicating that the setting completion button has been pushed. Accordingly, the print instruction unit 204 obtains necessary information from the content editing unit 202 and the print setting unit 205. Information required in the present embodiment is described as follows.

```
01 : var printSettings={
02 :   'trayInfo':{
03 :     'printWidth':300,
04 :     'printHeight':400,
05 :     'position':[
06 :         {'x':60, 'y':60, 'width':80, 'height':80}
07 :         {'x':100, 'y':60, 'width':80, 'height':80}
08 :         {'x':60, 'y':100, 'width':80, 'height':80}
09 :         {'x':100, 'y':100, 'width':80, 'height':80}
10 :     ],
11 :     'maxMediaNum':4,
12 :     'type':'Tray-4'
13 :   },
14 :   'printNum':3,
15 :   'content':content
16 : };
```

Figure 8:
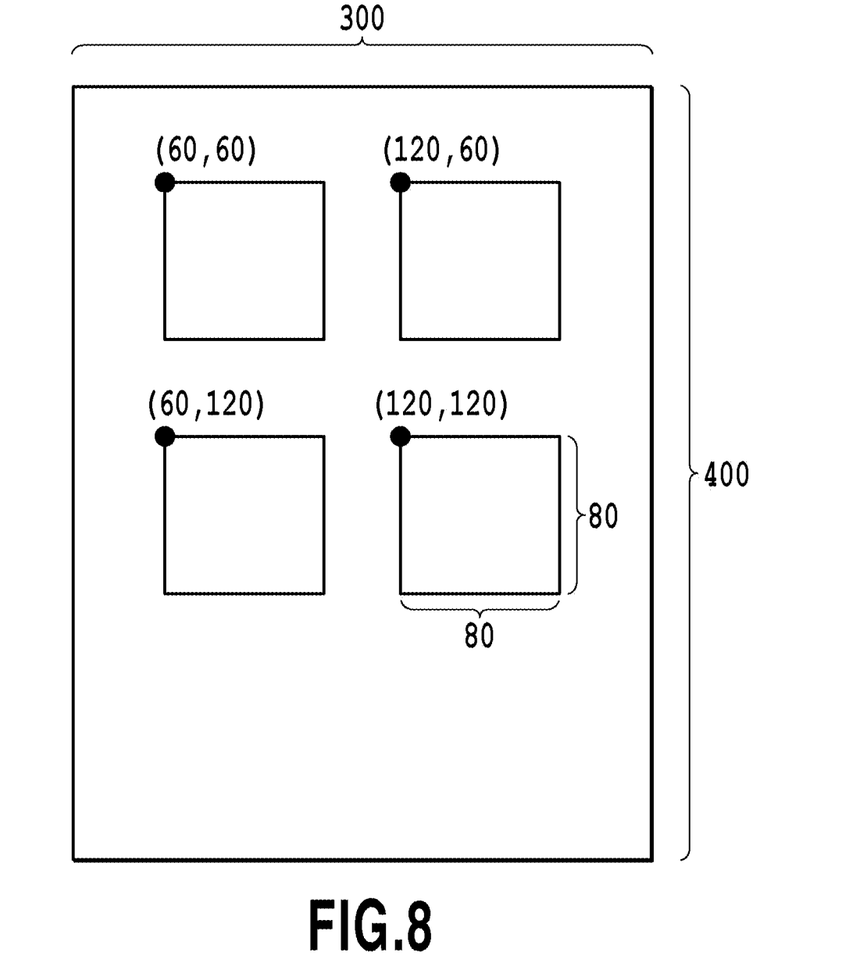
FIG. 8 is a diagram illustrating information relating to medium arrangement.

In the above description, "printerSettings" describes an object ("function") including tray information ("trayInfo"), the number of prints ("printNum"), and content (content). It is possible to determine whether or not printing is plural printing on the basis of the numerical value of "printNum". "TrayInfo" further includes the print vertical width and horizontal width of the print ("printWidth, printHeight"), the position where the medium can be arranged and its size ("position"), the maximum number of media ("maxMediaNum") to be arranged, and the type of tray ("type"). By using the information of "trayInfo", as illustrated in FIG. 8, it is possible to determine "at what positions" "how much in maximum" "what size" media can be arranged. In the present embodiment, although the "width" and "height" in the "position" are all the same, it is also possible to deal with media having various sizes by designating different sizes. Herein, the "content" in "printerSettings" is described in SVG.

In addition, with respect to the processes in steps S302 and S303 described above, although it is assumed that the target printer can use the three types of trays, the invention is not limited to this mode of application. In addition, although it has been described that the information processing apparatus performs the process of FIG. 3 without obtaining the information of the tray mounted on the printer from the printer, the invention is not limited to this mode of application. Namely, the invention can be applied to a mode in which the information processing apparatus (smartphone) according to the present embodiment can also deal with a printer having a specification different from that of the above-described example. For example, besides the above-described printer that can use trays of which arrangement sites of media are four, six, and eight in maximum, respectively, there may be printers that can use six trays and eight trays in maximum. In this case, the application according to the present embodiment obtains information on the type of tray available from the printer at the time of performing data connection with the printer to perform printing before the process illustrated in FIG. 3. Then, in steps S302 and S303, the UI screen as illustrated in FIG. 6 is displayed according to the obtained tray type information (the number of trays and the arrangement site).

Referring to FIG. 3 again, in step S304, the notification data obtaining unit 206 obtains information such as the arrangement sites of the media on the basis of the tray type and the number of prints designated in steps S302 and S303, respectively. The information such as the arrangement sites of the media is notified to the user as described later. The data drawing unit 201 generates data for displaying the information. Hereinafter, the example is described where the user selects and designates a tray (Tray-4) where a maximum of four picks can be arranged in step S302 and the number of prints is designated to 3 in step S303.

Figure 9:
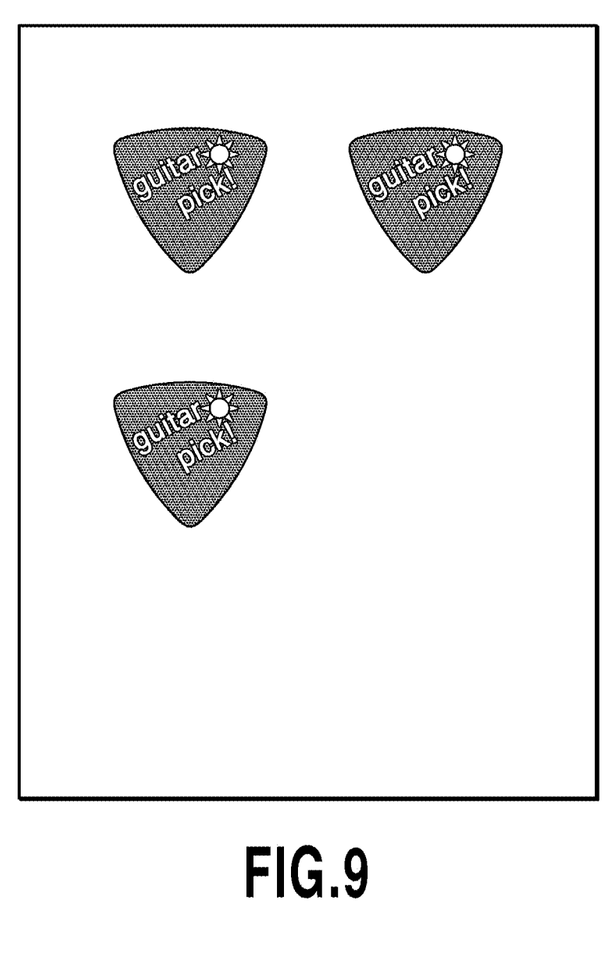
FIG. 9 is a diagram illustrating an image to be notified to a user.
Figure 10:
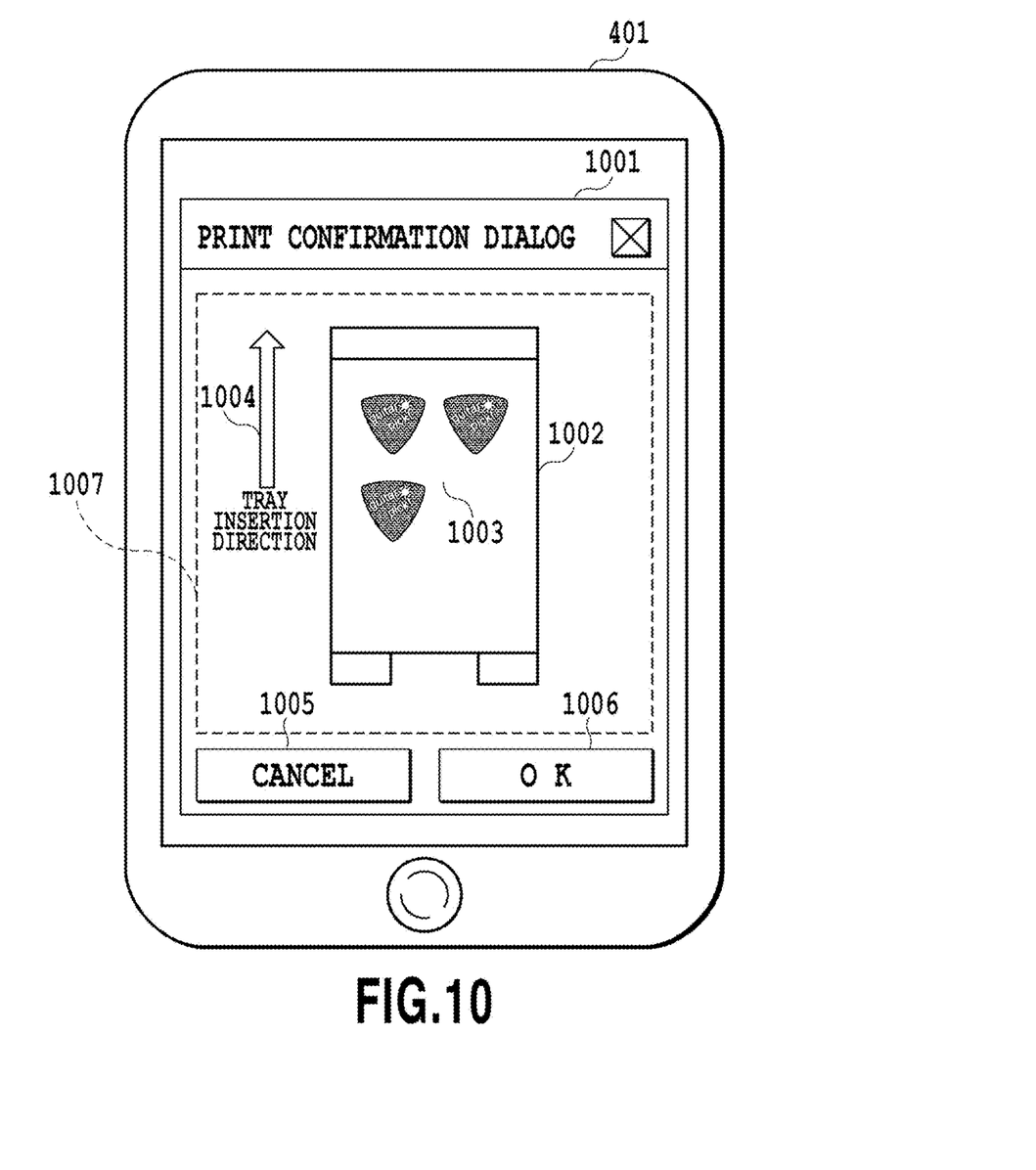
FIG. 10 is a diagram illustrating a UI screen displayed to the user.

The information such as arrangement site of these media is included in "printerSettings". By using the information of the "position" of "trayInfo" in order from the top, the notification data obtaining unit 206 generates the image of FIG. 9. The image of FIG. 9 includes main information of the information to be notified to the user. Namely, the image becomes an image reflecting the information on the appropriate arrangement of the picks and the sizes of the picks to be printed in response to designation of printing three picks by the user. In addition, the image data illustrated in FIG. 9 is also used as image data at the time of printing three picks. As information to be notified to the user other than the image illustrated in FIG. 9, there is auxiliary information for clarifying the arrangement sites of media such as the tray insertion direction 1004 or the tray's own image 1002 as illustrated in FIG. 10. By adding the auxiliary information to the notification data, it is possible to prevent the user from arranging the media in erroneous sites. Namely, information (the screen of the UI enclosed by a broken line 1007 in FIG. 10) including the auxiliary information and the image of FIG. 9 may be notified to the user as notification data. The auxiliary information may be dynamically generated by using JavaScript or may be prepared in advance as an image. In addition, it may be controlled such that the data to be notified from the outside with a QR code or the like is obtained and the information is allowed to be included in "printerSettings", so that the information can be added by the notification data obtaining unit 206. In addition, in FIG. 9, although all picks having the same design are arranged side by side, it is obvious that a plurality of designs may be generated and three designs may be selected and printed.

The example illustrated in FIG. 9 is an image illustrating an arrangement of media in a tray on which a maximum of four media are arranged. The image illustrated in FIG. 9 indicates that the media are arranged at three sites other than the arrangement site at the lower right of the tray. Such an arrangement can be determined according to specifications in a printing apparatus such as a printer that prints the media, a scheme of printing operation, and the like. For example, in a case of a scheme in which a printing apparatus performs printing while scanning a print head on media, in a scanning area where there is no data to be printed, scanning of the area is skipped. Therefore, if using a pattern concentrated on approximate scanning areas rather than distributing printing data of a plurality of media over different scanning areas, it is possible to more efficiently perform printing in terms of time. Therefore, in the present embodiment, in a case where the tray (FIG. 7B) capable of arranging a maximum of six media is designated and printing of three media is designated, the application arranges three media as follows. Namely, two media are arranged in the first row of FIG. 7B and one medium is arranged on the left side of the second row. Furthermore, in a case where the tray (FIG. 7C) capable of arranging a maximum of eight media is designated and printing of three media is designated, the application arranges three media in the first row of FIG. 7C. Such medium arrangement setting can be determined in advance in the application as described above. For example, the setting may be performed by preferentially selecting an arrangement site where the y value (the position of the vertical axis of the image) is close to the position of "printerSettings". If the arrangement site with the close y value is selected, the picks will be arranged side by side. Therefore, it is possible to print in more areas by one-time scanning of the print head. In another mode, there is a setting such that the x value of the "position" becomes close and the distance between x and y between two arrangement sites is as small as possible. In addition, the arrangement sites of the media may be determined in advance or may be dynamically determined according to the number of selected media and the type of tray to be used.

As described above, in the present embodiment, even in a case where the user selects a smaller number of arrangement sites than the number of arrangement sites of the media set in the tray, it is possible to present more efficient arrangement in terms of time in the printing apparatus to the user. As a result, it is possible to improve printing throughput of a printing system including the information processing apparatus and the printing apparatus.

In addition, the invention is not limited to the above-described example at the time of arranging three media. Furthermore, in a case where the number of media to be arranged is small, for example, in a case of one medium, the type of data to be notified may be changed according to the situation. For example, another form of information such as a description using a text may be notified to the user. The notification data obtaining unit 206 is not limited to data generation. But, the notification data obtaining unit may obtain information effective to prevent erroneous medium arrangement such as obtaining of the description using texts associated with medium arrangement, obtaining of samples prepared by the application, or obtaining of audio information.

Referring to FIG. 3 again, next, in step S305, the application notifies the notification data to the user by displaying the notification data generated in step S304. FIG. 10 is a diagram illustrating the UI screen (print confirmation dialog) displayed in S305. As described above, the tray 1002 designated by the user and an arrangement 1003 of the designated number of picks (media) are displayed. Furthermore, as auxiliary information, a direction 1004 in which the tray is inserted and a broken line 1007 indicating the area of the UI screen are displayed.

While watching the UI screen illustrated in FIG. 10, the user confirms the arrangement of the media in the tray. In addition, while watching the UI screen, the user arranges the media on the tray. In addition, the method of notifying, to the user, the arrangement position of the medium is not limited to display, but the method may be performed by voice or the like. Then, if the user pushes the "OK" button illustrated in FIG. 10, the application receives the input (S306). This input is an instruction to start printing (recording instruction), and the generation of data for transmission to the printer 112 is started. Namely, in step S307, the rendering unit 207 performs rendering by using the notification data (including the image data as illustrated in FIG. 9) obtained from the notification data obtaining unit 206. In addition, the rendering is executed with respect to the content including only the information necessary for printing as illustrated in FIG. 9. For example, as illustrated in FIG. 10, auxiliary information that contributes to the arrangement of the media by the user is not included. Herein, the process of step S307 includes a process of scaling the size of the content so as to be appropriate for transmission to the printer and a process performed by the format conversion unit 209 of converting the image format to the format that can be transmitted to the printer. Although the content may be described in any format, if the content is described in the format of SVG as in the present embodiment, the rendering can be performed by using, for example, the method disclosed in Japanese Patent Laid-Open No. 2016-14920. Next, in step S308, the command generation unit 210 allocates a command group for operating the printer to the rendered image data. The command allocated to the image data is, for example, described as follows.

```
01 : <?Xml version="1.0"?>
02 : <content>
03 :     <size> DVD </size>
04 :     <media> NORMAL PAPER </media>
05 :     <quality> HIGH </quality>
06 :     <imageData>
07 :         <width> 300</width>
08 :         <height> 400</height>
09 :         <format> JPEG </format>
10 :         <data> JPEG data </data>
11 :     </imageData>
12 : </content>
```

The above example is an example in which commands to be transmitted to the printer 112 are described in an XML format. For example, in Lines 3, 4, and 5, a setting for the printer "print in a high quality mode on a plain paper with a DVD size" is described. Furthermore, in Lines 7, 8, and 9, it is described that the print data is "JPEG data with a horizontal width of 300 and a vertical width of 400". Actual JPEG data (JPEG data in FIG. 9) is inserted in Line 10. The printer 112 executes printing by receiving the above-described commands together with image data. In the present embodiment, information such as the print size relating to command generation and the format of image data is not set by the application. This is because the information to be generated in the pick printing application is fixed. Therefore, it is not necessary to set the information. However, in a case where changing printing paper, quality, size, or the like, it is possible to change the printing paper, quality, size, or the like by adding the corresponding items to the print setting screen (FIG. 6). In addition, the setting information can be added to "printerSettings", and the information can be used at the time of command generation.

In step S309, the external device communication unit 211 transmits the generated data to the printer 112 through the external device communication unit 211. Namely, in S309, a command including the rendering result in S307 is transmitted to the printer 112. As a result, the printer 112 starts printing on the pick (medium) in the tray.

Heretofore, according to the present embodiment, the application determines the arrangement sites of the media on the basis of the setting information by the user and generates the image data as illustrated in FIG. 9 on the basis of the arrangement sites. Furthermore, the application notifies, to the user, the determined arrangement sites as illustrated in FIG. 10. Therefore, it can be expected that the user arranges the media at the positions notified as illustrated in FIG. 10, and the printer can appropriately perform printing on the respective media arranged on the tray. Namely, it is possible to synchronize the operation of arranging the media on the tray having a plurality of arrangement sites where the media are arranged with the printing process.

(Second Embodiment)

Figure 11:
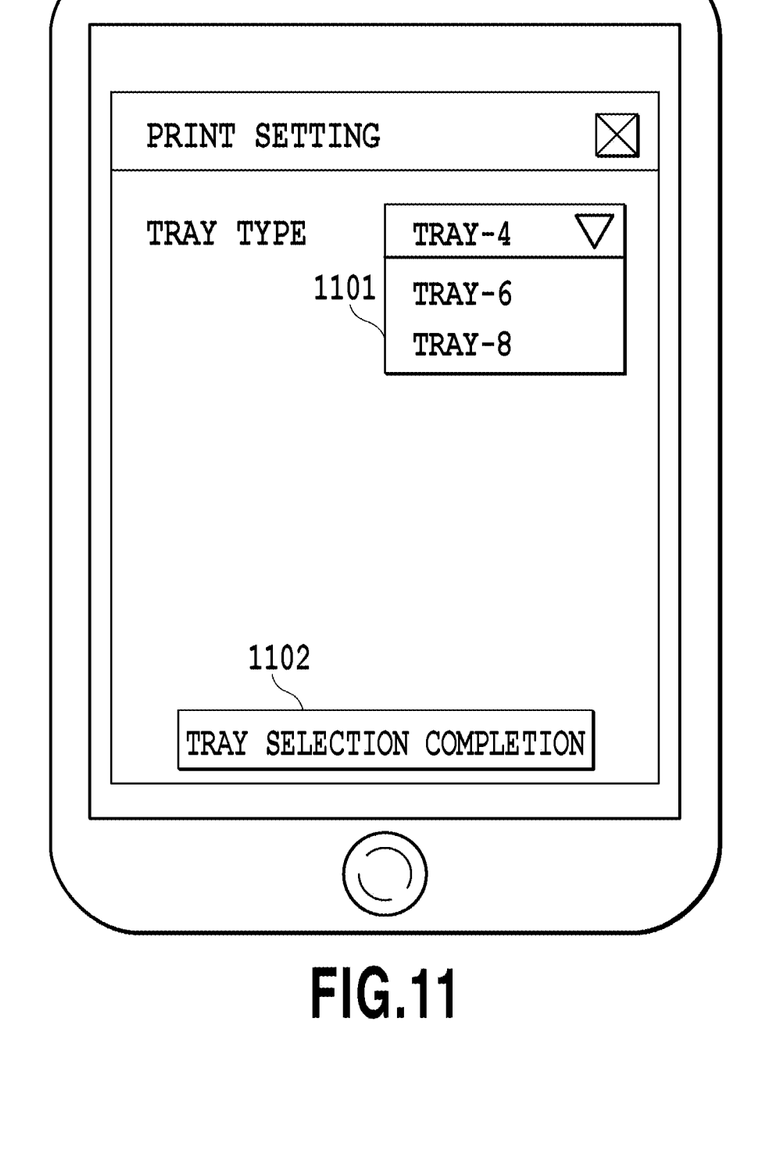
FIG. 11 is a diagram illustrating a print setting screen.

A second embodiment of the invention relates to a mode in which the user arbitrarily sets the number of media (the number of prints) on a UI screen of an information processing apparatus 115. Hereinafter, differences from the above-described first embodiment will mainly be described. With respect to the processes by the application illustrated in FIG. 3, until the input by the user pushing the print setting button 405 is received in step S302, the processes are the same as those of the first embodiment. If the application receives the input of pushing the print setting button 405, the application transitions to a print setting screen illustrated in FIG. 11. The user selects the type of tray to be used on the UI screen illustrated in FIG. 11. In addition, with respect to the selection of the tray type, a QR code may be used as described in the first embodiment. After the tray type is selected, the user pushes a tray selection completion button 1102 illustrated in FIG. 11. Accordingly, the application displays a UI screen for selecting an arrangement site of the pick illustrated in FIG. 12.

Figure 12:
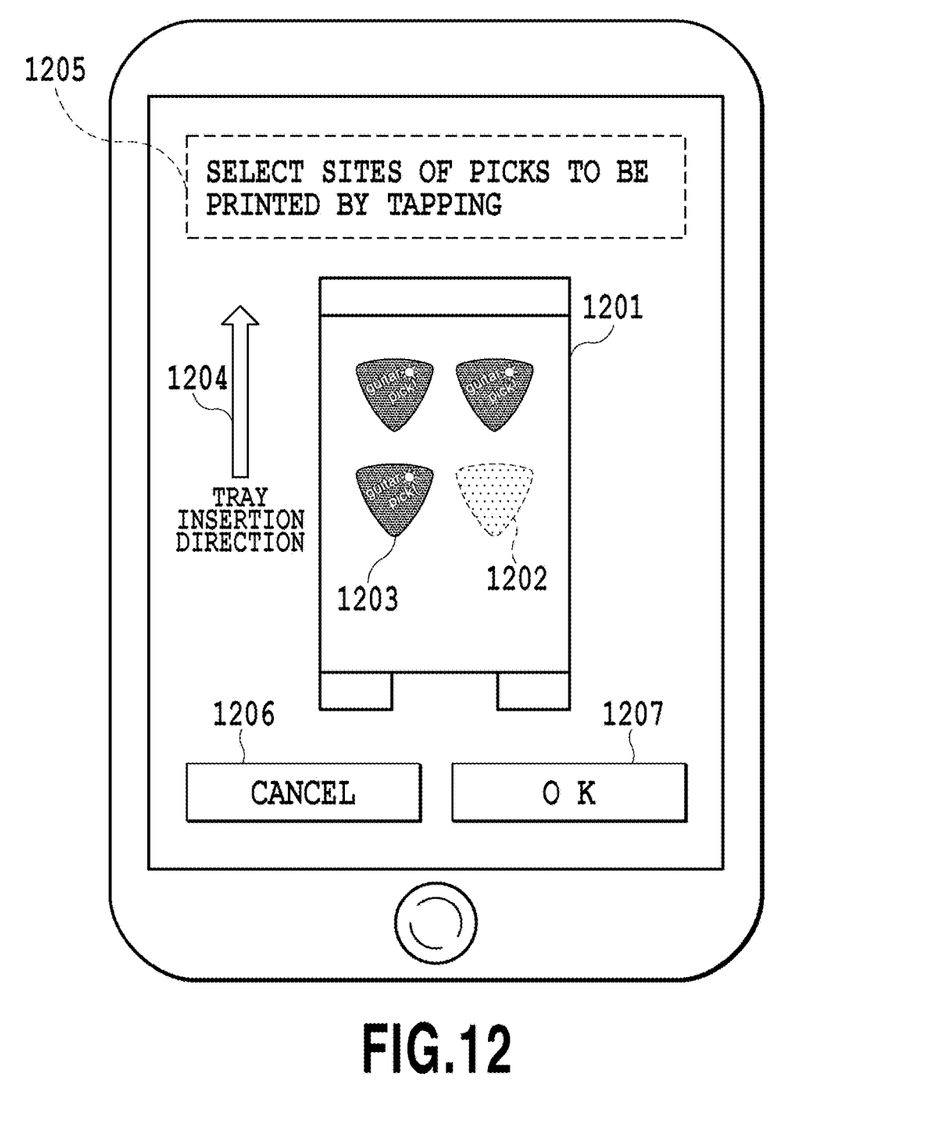
FIG. 12 is a diagram illustrating a screen for selecting a medium arrangement site.

FIG. 12 is a screen including the display of a tray 1201, and a guide 1205 on what kind of operation is to be performed is displayed together. In the initial state of the print pick designation screen, like a pick arrangement site 1202, all arrangement sites (four sites) are displayed in such a manner as to indicate that there is no pick including a content. In this screen, if the user taps a site where the user desires to arrange a pick, the display is changed to the display of a pick 1203 into which the content is inserted like the pick 1203. In the example illustrated in FIG. 12, three arrangement sites except for the lower and right portions are tapped.

In FIG. 12, since the user can select an arbitrary position, the user may select two picks in the upper portion and the pick arrangement site 1202 in the lower portion and may not select the arrangement site of the pick 1203. If the user selects three sites, that is, the two pick arrangement sites in the upper portion and the pick arrangement site 1202, the application generates image data including three images to be printed in the two arrangement sites in the upper portion and the pick arrangement site 1202.

As described above, in the present embodiment, the user can arbitrarily select and designate the arrangement sites of the media, and after that, pushes the OK button 1207, so that the rendering is started on the basis of the setting information.

In addition, although the above example relates to an example of arranging media having the same shape, the invention is not limited to this mode. The application can also perform the processes described above with reference to FIGS. 11 and 12 for setting of a plurality of media having different shapes.

(Other Embodiments)

The above-described embodiments relate to an example of directly arranging and fixing the media at the arrangement sites of the tray, but the invention is not limited to this example. As described in Japanese Patent Laid-Open No. 2004-338338, media may be arranged and fixed through adapters.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above configuration, it is possible to obtain a print result which the user desires to obtain in printing by using a tray of a type capable of arranging a plurality of media on the tray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-108759, filed May 31, 2016, which is hereby incorporated by reference wherein in its entirety.

What is claimed is:

1. A non-transitory computer readable storage medium storing a program for causing an information processing apparatus capable of communicating with a printing apparatus that performs printing on at least one print medium arranged in a tray having a plurality of sites for arranging the print medium to execute a control method, wherein the control method including:
    obtaining information on an arrangement site indicating a site where the print medium is arranged among a plurality of arrangement sites of the print medium in the tray;
    notifying, to a user, the arrangement site of the print medium in the tray on the basis of information on the arrangement site; and
    transmitting, to the printing apparatus, printing data for printing an image on the print medium arranged on the tray, which is generated on the basis of the information on the arrangement site;
    wherein the information on the arrangement site includes designation of the arrangement sites of which number is smaller than the maximum number of arrangement sites in the tray, and in a case where the information on the arrangement sites is the designation of the arrangement sites of which number is smaller than the maximum number of arrangement sites, the arrangement sites designated according to the number of designated arrangement sites are notified.

2. The non-transitory computer readable storage medium according to claim 1, wherein the arrangement site of the print medium in the tray, printing data to be printed on the print medium, and information other than the printing data to be printed on the print medium are displayed.

3. The non-transitory computer readable storage medium according to claim 1, wherein the information on the arrangement site is determined on the basis of information on the tray to be used and the number of printing media arranged on the tray or on the basis of designation by the user.

4. The non-transitory computer readable storage medium according to claim 1, wherein the printing data to be printed on the print medium includes rendered data.

5. The non-transitory computer readable storage medium according to claim 1, further obtaining information on the tray to be used in the printing apparatus.

6. An information processing apparatus capable of communicating with a printing apparatus that performs printing on at least one print medium arranged in a tray having a plurality of sites for arranging the print medium, comprising:
    a memory containing instructions; and
    a processor executing the instructions to operate as
    an obtaining unit configured to obtain information on an arrangement site indicating a site where the print medium is arranged among a plurality of arrangement sites of the print medium in the tray;
    a notification unit configured to notify, to a user, the arrangement site of the print medium in the tray on the basis of information on the arrangement site; and
    a transmission unit configured to transmit, to the printing apparatus, printing data for printing an image on the print medium arranged on the tray, which is generated on the basis of the information on the arrangement site;
    wherein the information on the arrangement site includes designation of the arrangement sites of which number is smaller than the maximum number of arrangement sites in the tray, and in a case where the information on the arrangement sites is the designation of the arrangement sites of which number is smaller than the maximum number of arrangement sites, the notification unit notifies the arrangement sites designated according to the number of designated arrangement sites.

7. The information processing apparatus according to claim 6,
    wherein the notification unit performs a process of causing a display to display the arrangement site of the print medium in the tray and the printing data to be printed on the print medium, and
    wherein information other than printing data to be printed on the print medium is displayed on the display.

8. The information processing apparatus according to claim 6, wherein the information on the arrangement site is determined on the basis of information on the tray to be used and the number of printing media arranged on the tray or on the basis of designation by the user.

9. The information processing apparatus according to claim 6, wherein the printing data to be printed on the print medium includes rendered data.

10. The information processing apparatus according to claim 6, wherein the instructions are executed to operate as a second obtaining unit configured to obtain information on the tray used in the printing apparatus.

11. A control method in an apparatus capable of communicating with a printing apparatus that performs printing on at least one print medium arranged in a tray having a plurality of sites for arranging the print medium, the method comprising:
    obtaining information on an arrangement site indicating a site where the print medium is arranged among a plurality of arrangement sites of the print medium in the tray;
    notifying, to a user, the arrangement site of the print medium in the tray on the basis of information on the arrangement site; and
    transmitting, to the printing apparatus, printing data for printing an image on the print medium arranged on the tray, which is generated on the basis of the information on the arrangement site;
    wherein the information on the arrangement site includes designation of the arrangement sites of which number is smaller than the maximum number of arrangement sites in the tray, and in a case where the information on the arrangement sites is the designation of the arrangement sites of which number is smaller than the maximum number of arrangement sites, the arrangement sites designated according to the number of designated arrangement sites are notified.

12. The control method according to claim 11, wherein the arrangement site of the print medium in the tray, printing data to be printed on the print medium, and information other than the printing data to be printed on the print medium are displayed.

13. The control method according to claim 11, wherein the information on the arrangement site is determined on the basis of information on the tray to be used and the number of printing media arranged on the tray or on the basis of designation by the user.

14. The control method according to claim 11, wherein the printing data to be printed on the print medium includes rendered data.

15. The control method according to claim 11, further obtaining information on the tray used in the printing apparatus.

* * * * *